Heliker & Burlew,
Churn Dasher.
No. 105,071.  Patented July 5, 1870.
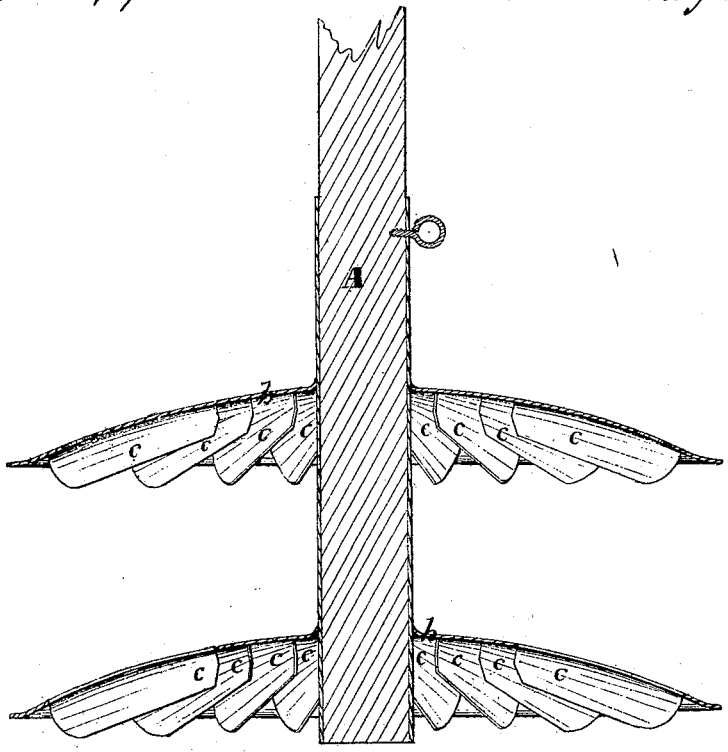
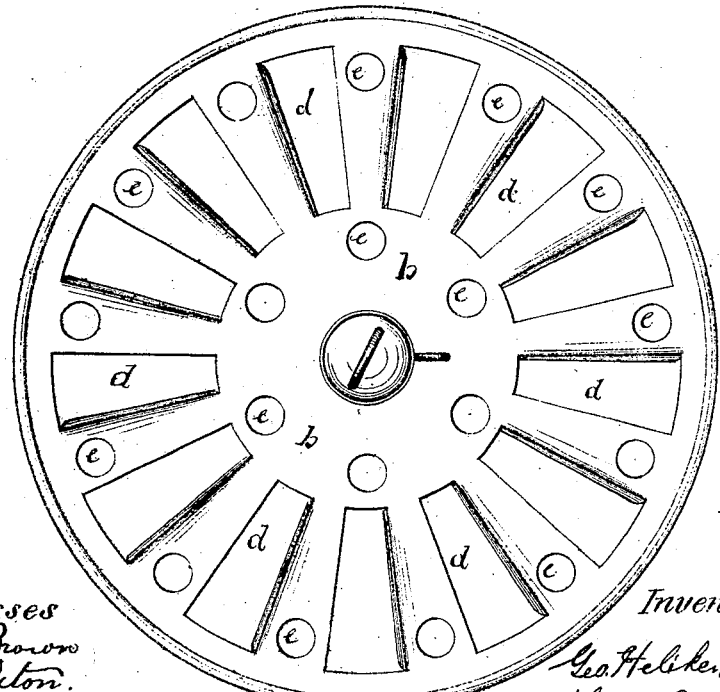
Witnesses
G. O. Brown
M. E. Orton.
Inventors
Geo. Heliker,
Abram Burlew,
by Geo. E. Brown.
Atty.

United States Patent Office.

GEORGE HELIKER AND ABRAM BURLEW, OF GREENWICH, OHIO.

Letters Patent No. 105,074, dated July 5, 1870.

IMPROVEMENT IN CHURN-DASHERS

The Schedule referred to in these Letters Patent and making part of the same.

*To all whom it may concern:*

Be it known that we, GEORGE HELIKER and ABRAM BURLEW, of Greenwich, in the State of Ohio, have invented a new and useful Improvement in Churn-Dashers; and we do hereby declare that the following is a full, clear, and exact description of the same, reference being had to the accompanying drawing and letters of reference marked thereon making part of this specification, in which—

Figure 1 is a sectional elevation, and
Figure 2, a plan view.

This invention consists of a concave disk, placed on an ordinary vertical handle, and provided with a radial series of flanges projecting downward from its under side, and with a radial series of slots between the flanges, and with sundry circular orifices, through which slots and orifices cream passes, and by which flanges the cells of cream containing butter are broken, and by which disk the separate lumps of butter are collected.

To enable those skilled in the art to make and use our invention, we now proceed to describe its construction and operation.

Similar letters in the drawing refer to like parts.

A is the vertical handle or stock;
b, the concave disk;
c, the radial flanges;
d, the radial slots; and
e, the circular orifices.

One or more of the disks may be placed on the handle.

When more than one disk is employed, the upper one should be made capable of sliding on the handle.

The flanges are inclined, so as to assist in driving cream through the slots and orifices.

By the use of this dasher, butter is brought easily, quickly, and without breaking its grain.

Claim.

The concave disk b, provided with the inclined flanges c, slots d, and orifices e, in the manner and for the object specified.

GEORGE HELIKER.
ABRAM BURLEW.

Witnesses:
C. B. STICKNEY,
G. P. BIRDSEYE.